US006880484B1

(12) United States Patent  (10) Patent No.:     US 6,880,484 B1
Lee                                       (45) Date of Patent:     Apr. 19, 2005

(54) SELF-WATERING POT

(76) Inventor: San Fu Lee, 3922 W. Osborne Ave., Tampa, FL (US) 33684-5695

( * ) Notice: Subject to any disclaimer, the term of this patent is extended or adjusted under 35 U.S.C. 154(b) by 42 days.

(21) Appl. No.: 10/707,448

(22) Filed: Dec. 15, 2003

Related U.S. Application Data

(62) Division of application No. 10/065,065, filed on Sep. 13, 2002, now Pat. No. 6,691,460.

(51) Int. Cl.[7] .............................................. A01K 7/00
(52) U.S. Cl. ............................. 119/74; 47/79; 251/209
(58) Field of Search ............... 119/77, 74, 51.5; 47/79, 47/80; 251/209

(56) References Cited

U.S. PATENT DOCUMENTS

| 1,158,676 A | * | 11/1915 | Fudder | 222/403 |
| 1,236,421 A | * | 8/1917 | Fudder | 222/353 |
| 5,687,783 A | * | 11/1997 | Finnegan | 141/364 |
| 6,691,460 B1 | * | 2/2004 | Lee | 47/79 |

* cited by examiner

*Primary Examiner*—Jeffrey L. Gellner
(74) *Attorney, Agent, or Firm*—Ronald E. Smith; Smith & Hopen, P.A.

(57) ABSTRACT

A double-walled container having a bottom wall, an exterior wall, and an interior wall disposed in concentric relation to the exterior wall. The bottom wall, the exterior wall, and the interior wall define a liquid fluid-holding reservoir. An annular top wall interconnects the exterior wall and the interior wall at their respective uppermost rims. A fill opening formed in the top wall enables introduction of liquid fluid into the liquid fluid-holding reservoir. The interior wall and the bottom wall define a soil or liquid fluid-holding space. A flow control valve extends through a first opening formed in the exterior wall and a second opening formed in the interior wall. Liquid fluid in the liquid fluid-holding reservoir is introduced into fluid communication with soil in the soil-holding space by opening the flow control valve. In another embodiment, a flask is retrofit into a single-walled container.

1 Claim, 13 Drawing Sheets

SELF-WATERING POT

CROSS-REFERENCE TO RELATED DISCLOSURE

This disclosure is a divisional application claiming the benefit of the filing date of a U.S. patent application entitled: "Self-Watering and Fertilizing Pot for Plants" by the same inventor, filed on Sep. 13, 2002, bearing Ser. No. 10/065,065, now U.S. Pat. No. 6,691,460 B1.

BACKGROUND OF THE INVENTION

1. Field of the Invention

This invention relates, generally, to means for watering and fertilizing potted plants or flowers in vases. More particularly, it relates to means for watering and fertilizing means that conserves water.

2. Description of the Prior Art

Some plants require daily watering and cannot be left unattended for more than a few days. Other plants require drying out between watering. Their roots are heavily soaked, allowed to dry over a period of a week or so, and then heavily watered again.

These plants may be left unattended for a little more than a week, but not much more.

Plants also require fertilizer, but usually on a less frequent basis than water.

Numerous self-watering pots have been developed to enable plant caretakers to take vacations or to avoid daily and weekly watering of plants for other reasons. Typically, these methods include a remote reservoir of water in fluid communication with one of more pots.

In some designs, wicks are employed to draw water from an external reservoir into the soil within which a plant is rooted.

One of the drawbacks of the known systems is that no means are provided to regulate water flow to individual plants. Thus, all plants in the network receive about the same amount of water over a given period of time. Thus, too much water is provided to some plants and too little to others. As a result, water is wasted through excessive evaporation or by draining from the bottom of a pot containing an over-watered plant. Some plants are killed from over-watering and some die from under-watering.

However, in view of the prior art considered as a whole at the time the present invention was made, it was not obvious to those of ordinary skill in the pertinent art how the drawbacks of the known plant-watering systems could be overcome.

SUMMARY OF INVENTION

The long-standing but heretofore unfulfilled need for a self-watering pot for plants is now met by a new, useful, and nonobvious invention.

In a first embodiment, the novel structure includes a double-walled container having a bottom wall, an exterior wall extending upwardly from a peripheral edge of the bottom wall, and an interior wall extending upwardly from the bottom wall in concentric relation to the exterior wall.

A liquid fluid-holding reservoir is defined by the bottom wall, the exterior wall, and the interior wall.

A top wall of annular or other predetermined configuration interconnects the exterior wall and the interior wall at their respective uppermost rims. A fill opening is formed in the top wall to enable introduction of liquid fluid into the liquid fluid-holding reservoir.

A soil or liquid fluid-holding space is defined by the interior wall and the bottom wall. A first opening is formed in the exterior wall and a second opening is formed in the interior wall in alignment therewith.

A flow control valve means extends through the first and second openings. The flow control valve means includes a control knob mounted to the proximal end of an elongate tapered stem. The control knob is external to the pot and the elongate tapered stem is immersed in the liquid fluidholding reservoir.

The elongate tapered stem has a distal end adapted to extend into the soil. The stem is disposed through the first and second openings so that full rotation of the control knob in a first direction seals the first and second openings and so that rotation of the control knob in a second direction opposite to the first direction maintains the first opening in a sealed condition but opens the second opening so that water in the liquid fluid-holding reservoir flows into the soil or liquid-fluid folding space.

In this way, the control valve can be set so that liquid fluid gradually seeps into the soil or the liquid fluid-holding space at a preselected rate. Accordingly, a plant rooted in the soil receives water from the liquid fluid-holding reservoir for an extended period of time so that a human need not water the plant on a daily of weekly basis and so that water is concerved.

In a second embodiment, a false bottom wall is positioned in parallel relation to the true bottom wall, upwardly thereof to create a second liquid fluid-holding reservoir between the false bottom wall and the true bottom wall so that the soil that is in the soil or liquid fluid-holding space is supported by the false bottom wall.

In this second embodiment, at least one opening is formed in the interior wall above a plane defined by the true bottom wall and below a plane defined by the false bottom wall so that liquid fluid in the liquid fluid-holding reservoir flows into a second liquid fluid-holding reservoir defined by the true bottom wall, the false bottom wall, and a lower part of the interior wall having said at least one opening formed therein.

In additional embodiments, vases are provided for holding flowers and containers are provided for holding water for feeding animals. No soil is contained in such additional embodiments.

In another embodiment, a plurality of self-watering, self-fertilizing pots are connected to a manifold that is connected to a holding tank. Timers on the manifold control the delivery of water to the respective reservoirs of each potted plant. A flow control valve is provided on each pot in the network of pots so that a user controls the individual requirements of each plant as in the earlier embodiments.

Another embodiment includes an apparatus that is retrofit into a pot for plants, so that the pot becomes a self-watering pot. It is provided in the form of a single-walled container or flask having a bottom wall, a side wall mounted about and extending upwardly from a peripheral edge of the bottom wall, and a top wall. A liquid fluid-holding reservoir is defined by the bottom wall, the side wall, and the top wall. A fill opening is formed in the top wall so that liquid fluid may be introduced into the liquid fluid-holding reservoir.

The single-walled container has a narrow structure to facilitate its insertion into soil contained within a conventional single-walled pot for plants. A flow control valve means has an elongate tapered stem that extends through the container.

The elongate tapered stem has a distal end adapted to extend into the soil. The flow control valve means has a control knob positioned on an external surface of the single-walled container. Full rotation of the control knob in a first direction is adapted to prevent flow of water from the liquid fluid-holding reservoir into the soil and rotation of the control knob in a second direction opposite to the first direction is adapted to enable liquid fluid in the reservoir to flow into the soil. In this way, the flow rate of liquid fluid into the soil is controllable by the flow control valve means.

The control knob is mounted on the external surface of the container at the top wall thereof and a linkage means interconnects the control knob to the tapered stem. The linkage means includes an elongate control shaft that rotates conjointly with the control knob, a first gear means mounted to a distal end of the elongate control shaft that rotates conjointly with the control shaft, and a second gear means mounted on the elongate tapered stem that is driven by the first gear means so that rotation of the control knob in a first direction effects simultaneous rotation of the elongate tapered shaft in a first direction and so that rotation of the control knob in a second direction effects simultaneous rotation of the elongate tapered shaft in a second direction opposite to the first direction. Rotation of the control knob in the first direction therefore reduces a flow rate of liquid fluid into the soil and rotation of the control knob in the second direction increases the flow rate.

A seeping chamber may be secured to the container on a sidewall thereof that abuts the soil when the container is positioned within the pot. The seeping chamber has at least one weep opening formed therein. The seeping chamber is adapted to house the distal end of the elongate tapered stem so that liquid fluid flowing from the liquid fluid filled space must first enter the seeping chamber before flowing into the soil through the at least one weep opening.

A wick means having a first end disposed within the seeping chamber and a second end disposed external to the seeping chamber may be provided as well. The second end is adapted to be in contact with the soil, there being an opening formed in the seeping chamber through which the wick extends.

The primary object of this invention is to preserve water resources.

An important object of this invention is to provide a pot for potted plants that delivers an appropriate amount of water or liquid nutrient to the soil within which the plant is rooted so that water is not wasted.

Another important object is to provide a plant-watering system that handles multiple plants at a time, sending to each a correct amount of water on a timely basis.

Other objects include the provision of water to flower vases or pet dishes.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Referring now to FIGS. 1–4, it will there be seen that the reference numeral 10 denotes a first illustrative embodiment of the present invention as a whole.

Pot 10 is double-walled, having true bottom wall 11 and having exterior wall 12 and interior wall 14 separated by a liquid fluid-holding reservoir 16 (FIG. 3) that may be of annular or other predetermined configuration. Bottom wall 15 is formed integrally with interior wall 14. Roots 18 of plant 20 grow within soil 22. The space occupied by soil 22 is a liquid fluid-holding space in embodiments where no soil is provided. Top wall 24 inhibits evaporation when annular liquid fluid-holding reservoir 16 is filled with water 25 or a mixture of water and liquid fertilizer or liquid nutrients. Liquid fluid is introduced into annular liquid fluid-holding reservoir 16 through fill opening 26 (FIG. 2) formed in top wall 24. Fill cap 28 closes opening 26.

When fully seated, cap 28 could cause formation of a vacuum at the top of pot 10, preventing water 25 from flowing. Accordingly, slot 30 (FIG. 2) is formed in open communication with fill opening 26 to prevent formation of said vacuum.

Figures 3, 4:
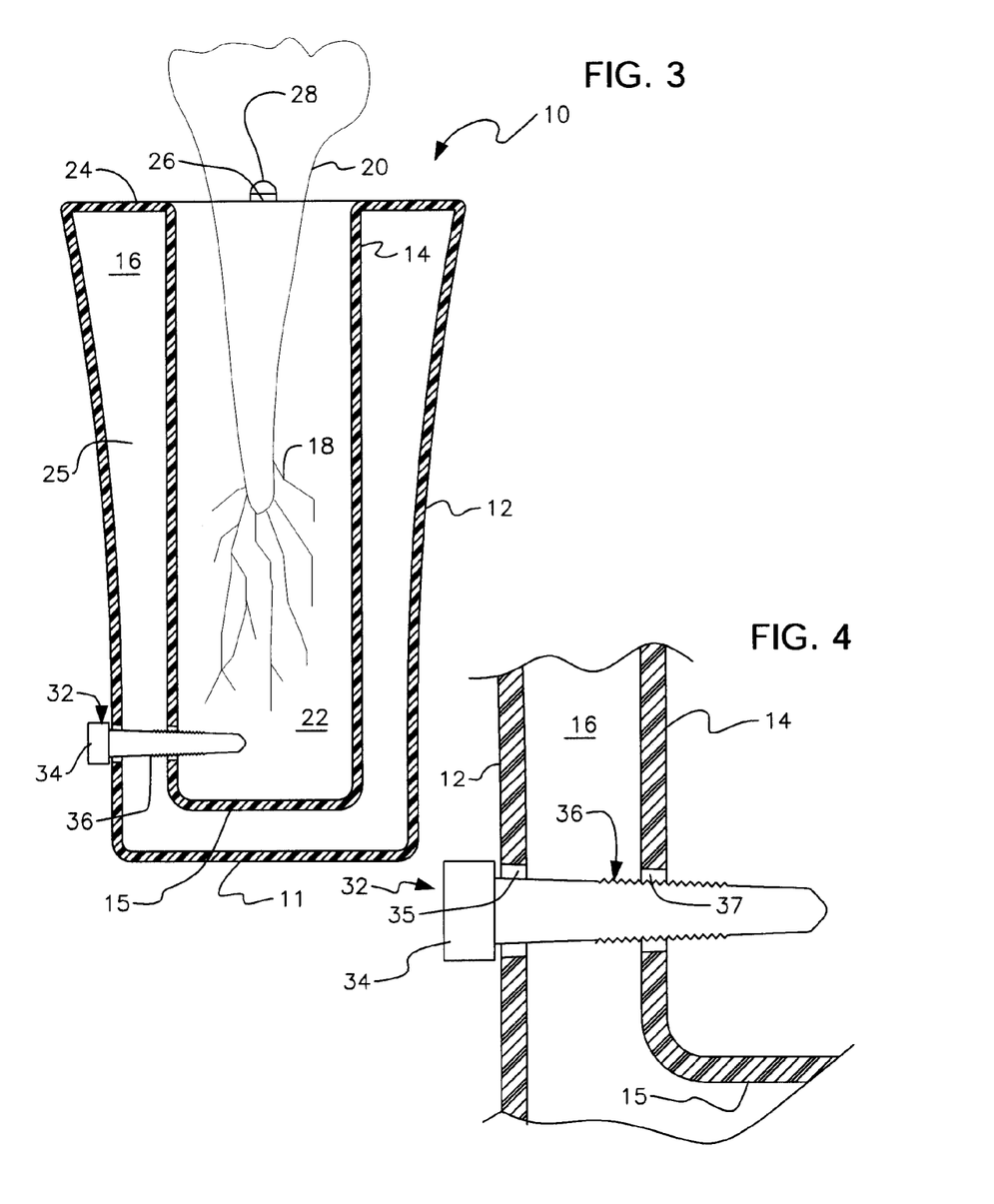
FIG. 3 is a sectional view of the first embodiment.
FIG. 4 is a detailed sectional view depicting the novel flow control valve.

One of the important teachings of this invention relates to prevention of over-watering. To ensure that plant 20 in pot 10 is neither under nor over-watered, flow control valve 32 is provided near the bottom of pot 10. In this first embodiment, flow control valve 32 has an elongate downwardly tapered stem 36 that extends through an opening formed in exterior wall 12, said opening lined with a suitable bushing 35 (FIG. 4). Elongate tapered stem 36 further extends through bushing 37 seated in a second opening formed in interior wall 14 in alignment with first opening 35. Control knob or handle 34 of flow control valve 32 is positioned on an external surface of exterior wall 12.

Accordingly, counterclockwise rotation of control knob 34 backs elongate tapered stem 36 out of sealing relation to bushing 37 so that water 25 in reservoir 16 may flow into soil 22. Due to the downwardly tapered structure of stem 36, increased counterclockwise rotation of control knob 34 increases the flow rate of water 25 into soil 22 and clockwise rotation reduces said flow rate until it becomes zero when control valve 32 is fully seated. In this way, the flow rate of water into soil 22 may be tightly controlled.

A tough sheet of tissue or paper, not shown, could be wrapped around elongate tapered stem 36 to help keep soil out of reservoir 16. When flow control valve 32 is at least slightly open, the water flow from reservoir 16 would help clean soil from the tissue as needed, flushing the soil back into the soil-holding space.

Figures 1, 1A, 2:
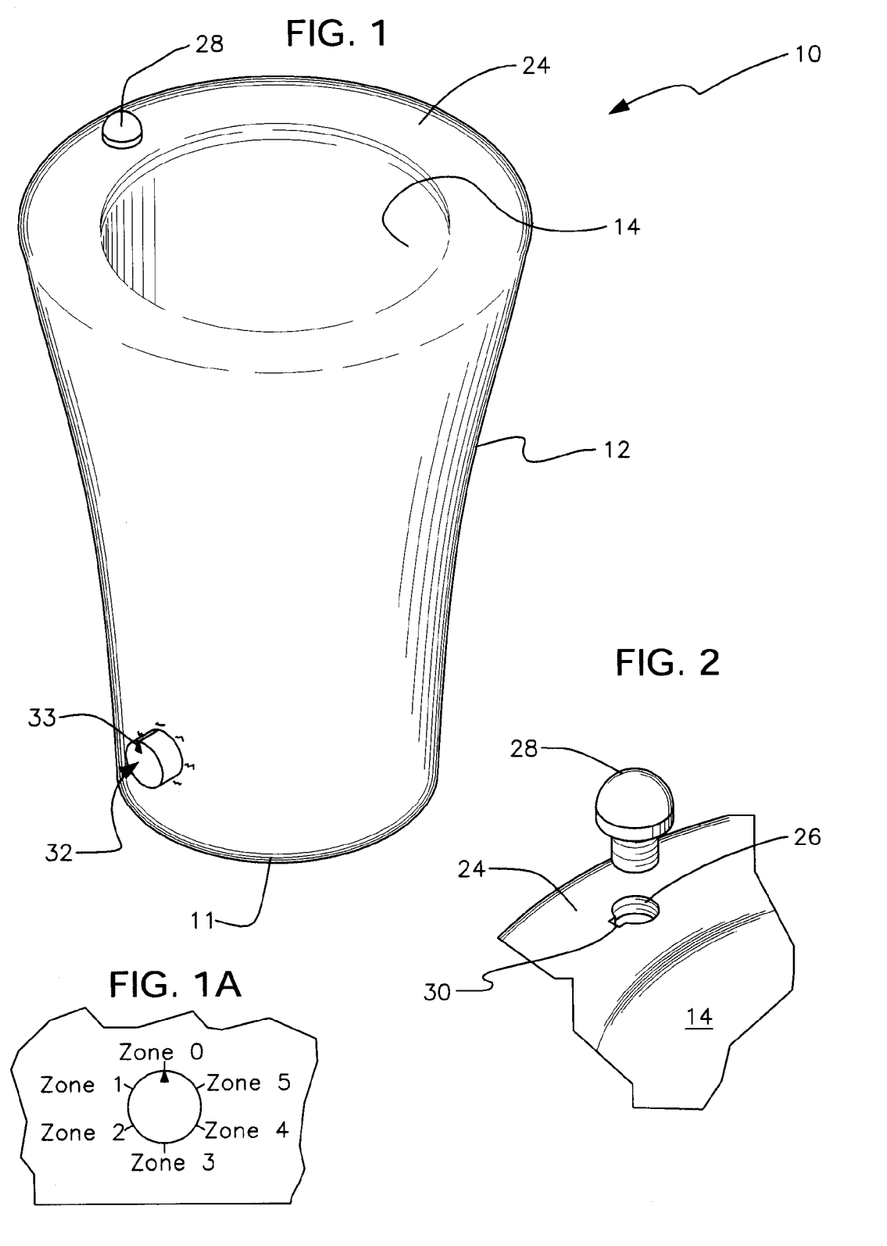
FIG. 1 is a perspective view of a first embodiment of the invention.
FIG. 1A is detailed view of the control knob of said first embodiment.
FIG. 2 is a detailed, exploded perspective view of a fill cap and air vent.

As depicted in increased detail in FIG. 1A, a pointer 33 in the form of a single-headed directional arrow is imprinted or otherwise applied to control knob 34. A plurality of numbered zones are imprinted or otherwise applied to exterior wall 12 in surrounding relation to control knob 34. A booklet would include information concerning which zone is appropriate for each plant that may be planted in container 10. For example, the booklet might state that pointer 33 should be aimed at zone one if cactus is planted in container 10 and at zone five if African Violets are planted in said container. In this way, different zones would be indicated for roses, wildflowers, various potted plants, and the like. The zone recommendations could also be varied in different parts of the earth since some areas have lower humidity than others, for example.

Figure 5:
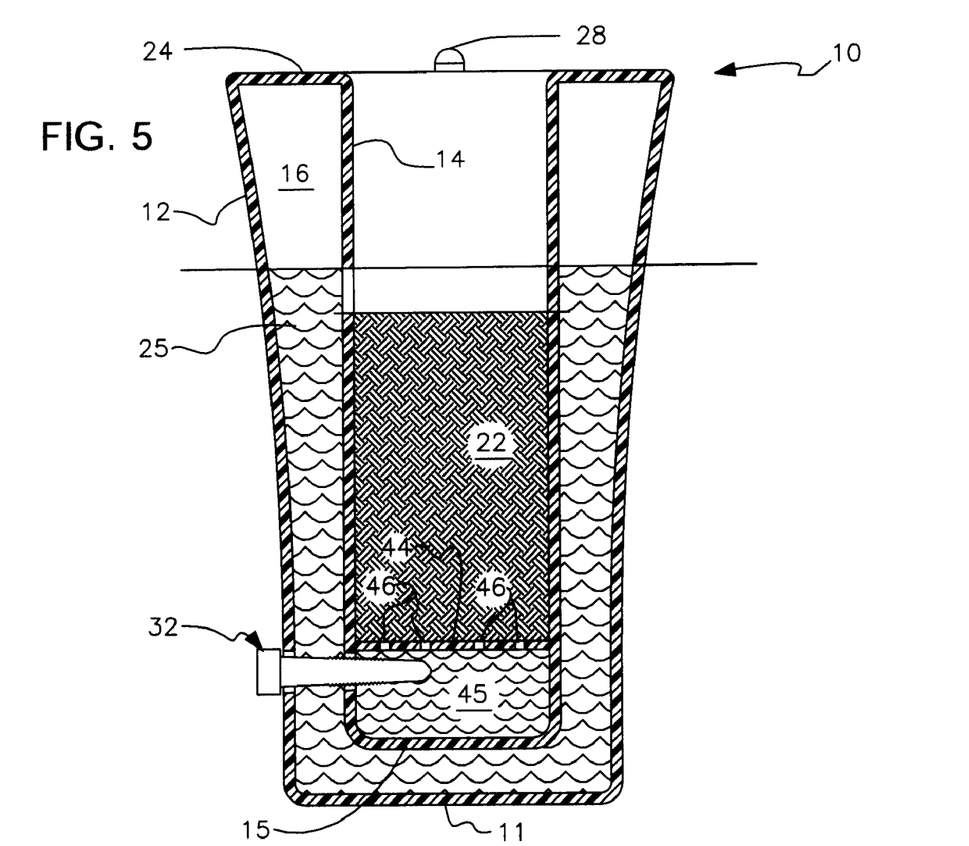
FIG. 5 is a sectional view of a second embodiment.

The second embodiment of this invention, depicted in FIG. 5, adds a false bottom 44 to the structure of FIGS. 1–4. This creates an additional liquid fluid-holding reservoir 45 for water or water mixed with liquid nutrients or fertilizer. Flow control valve 32 is positioned so that it extends into reservoir 45 as depicted. Plural openings, collectively denoted 46, are formed in false bottom 44 to enable water in reservoir 45 to come into contact with soil 22. False bottom 44 is disposed in parallel, vertically spaced apart relation to interior bottom wall 15. False bottom 44 supports soil 22 and enables water to flow under the soil to better distribute the moisture.

Figure 5A:
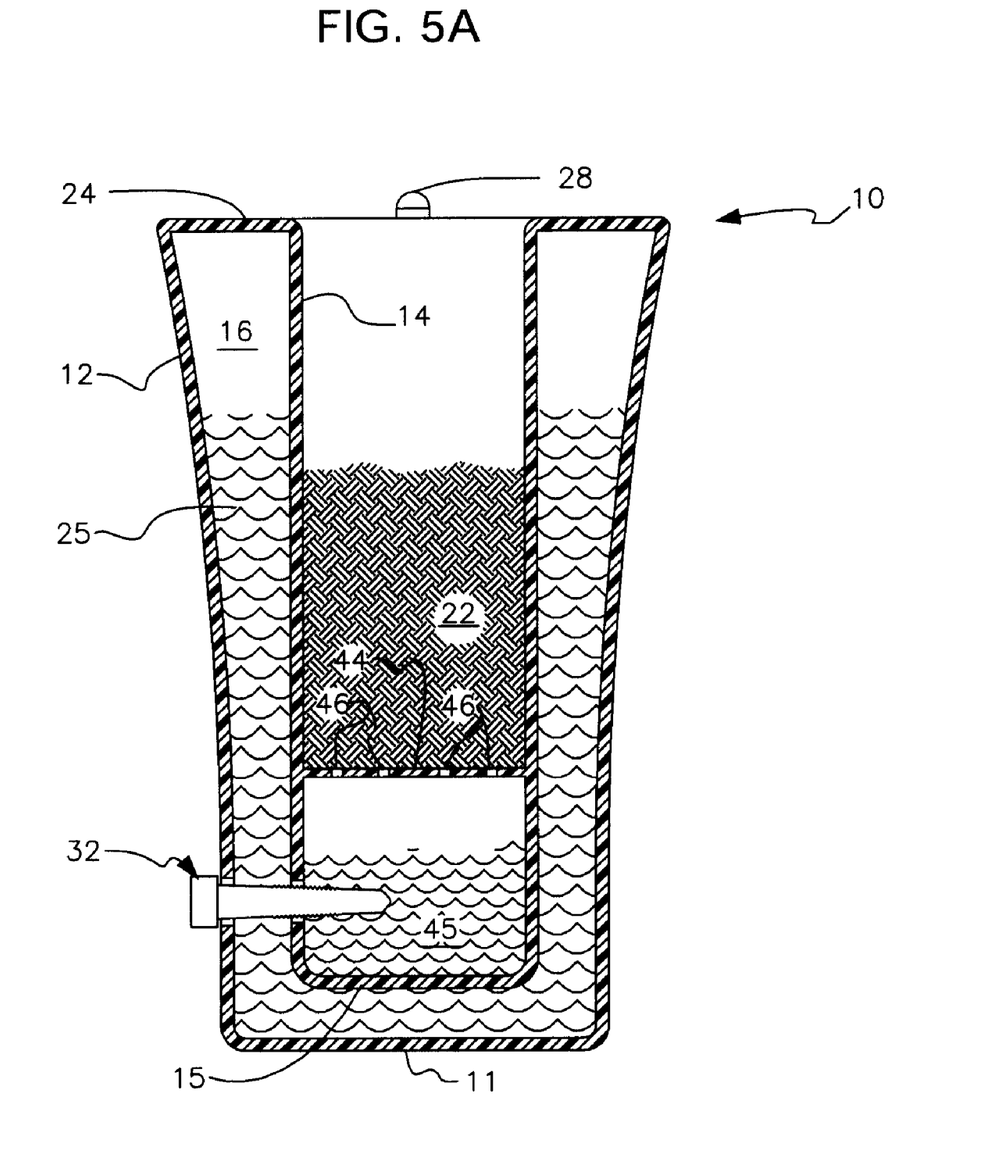
FIG. 5A is a sectional view of a variation of the second embodiment.

In a variation of the second embodiment, depicted in FIG. 5A, the water line is below false bottom 44 having openings 46 and soil 22 does not contact said false bottom. Soil 22 is kept moist, however, by the evaporation of water in reservoir 45. This structure is ideal for plants such as orchids that require moist but not soaked soil at all times.

Figure 6:
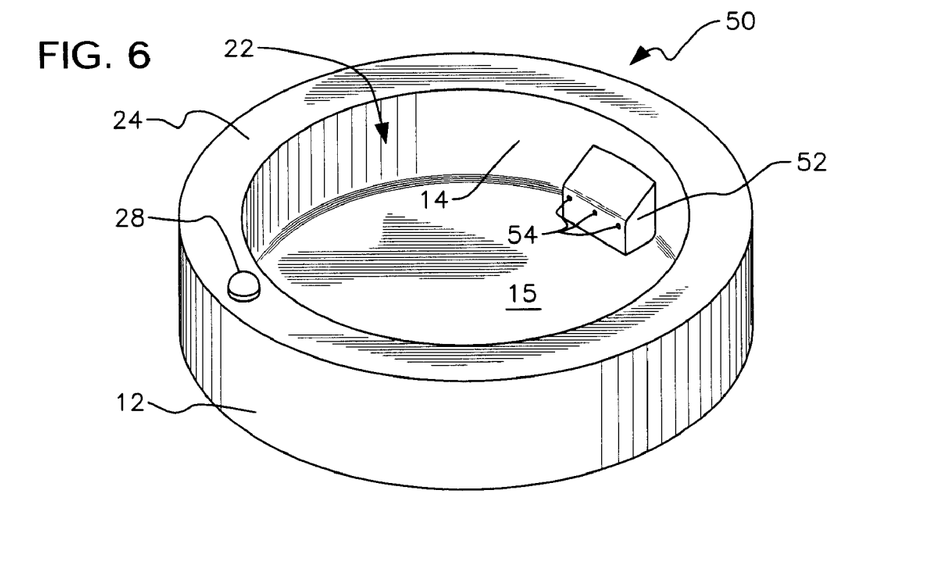
FIG. 6 is a perspective view of a third embodiment.
Figure 7:
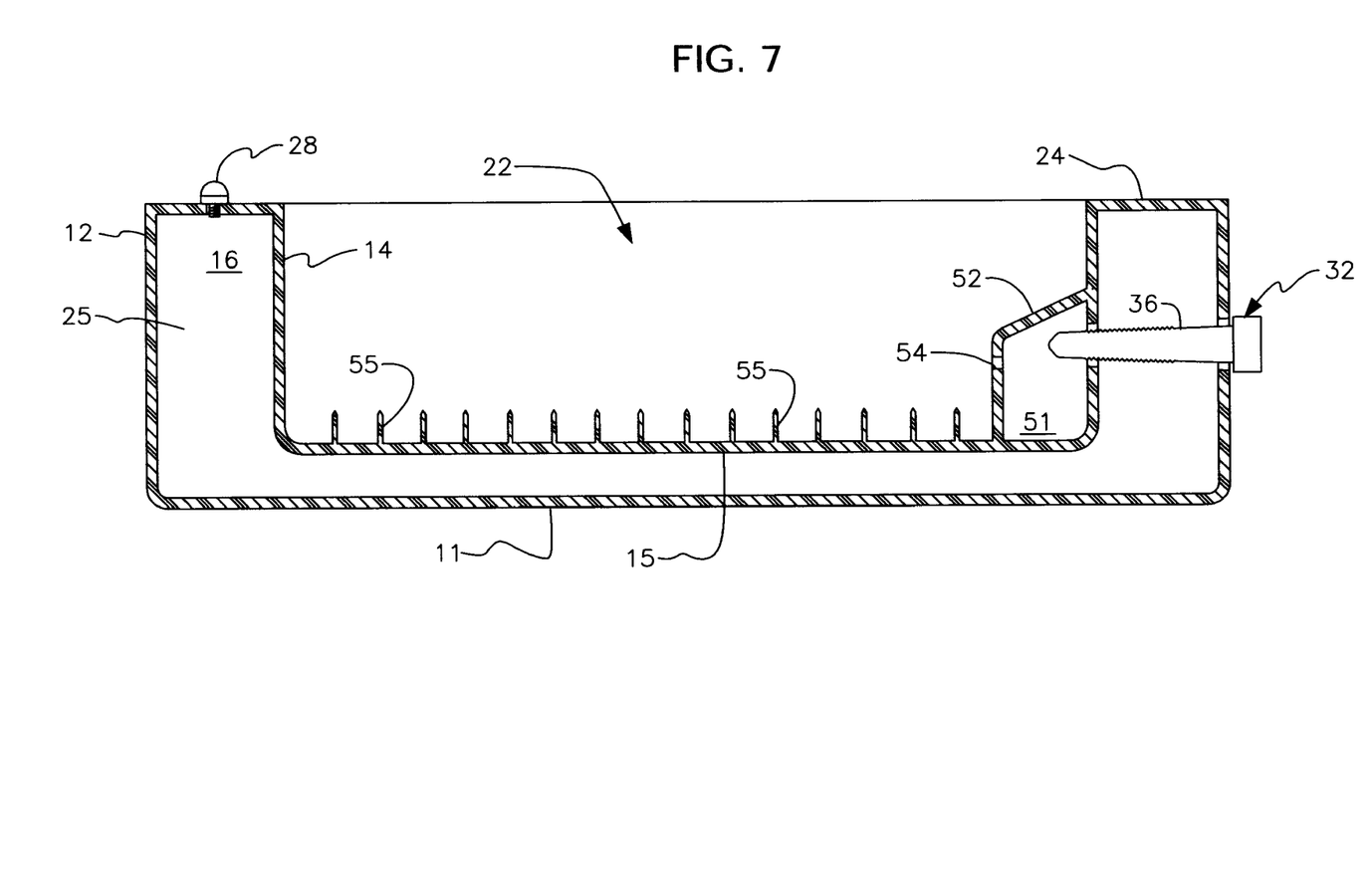
FIG. 7 is a sectional view of a variation of the third embodiment.

A shallow flower vase 50 having no soil is depicted in FIGS. 6 and 7 and represents the third embodiment of the invention. Its structure is similar to that of the deeper vases of FIGS. 1–5, as indicated by shared reference numerals. However, since there is no soil 22, this embodiment adds a seeping chamber or reservoir 51 (FIG. 7) defined by walls 52. The distal end of elongate tapered stem 36 of control valve 32 extends into seeping chamber 51 and the chamber fills to the level of laterally spaced apart weep openings 54 when control valve 32 is opened by counterclockwise rotation as described above. Water then flows through weep openings 54 to fill the liquid fluid-holding space 22 of the vase up to the level of said openings 54.

The embodiment of FIG. 7 differs from the embodiment of FIG. 6 only in that said FIG. 7 embodiment includes a plurality of rigid, upstanding spikes, collectively denoted 55, that impale the lowermost ends of elongate flower stems, not shown, to help them stand up.

Figures 8, 9:
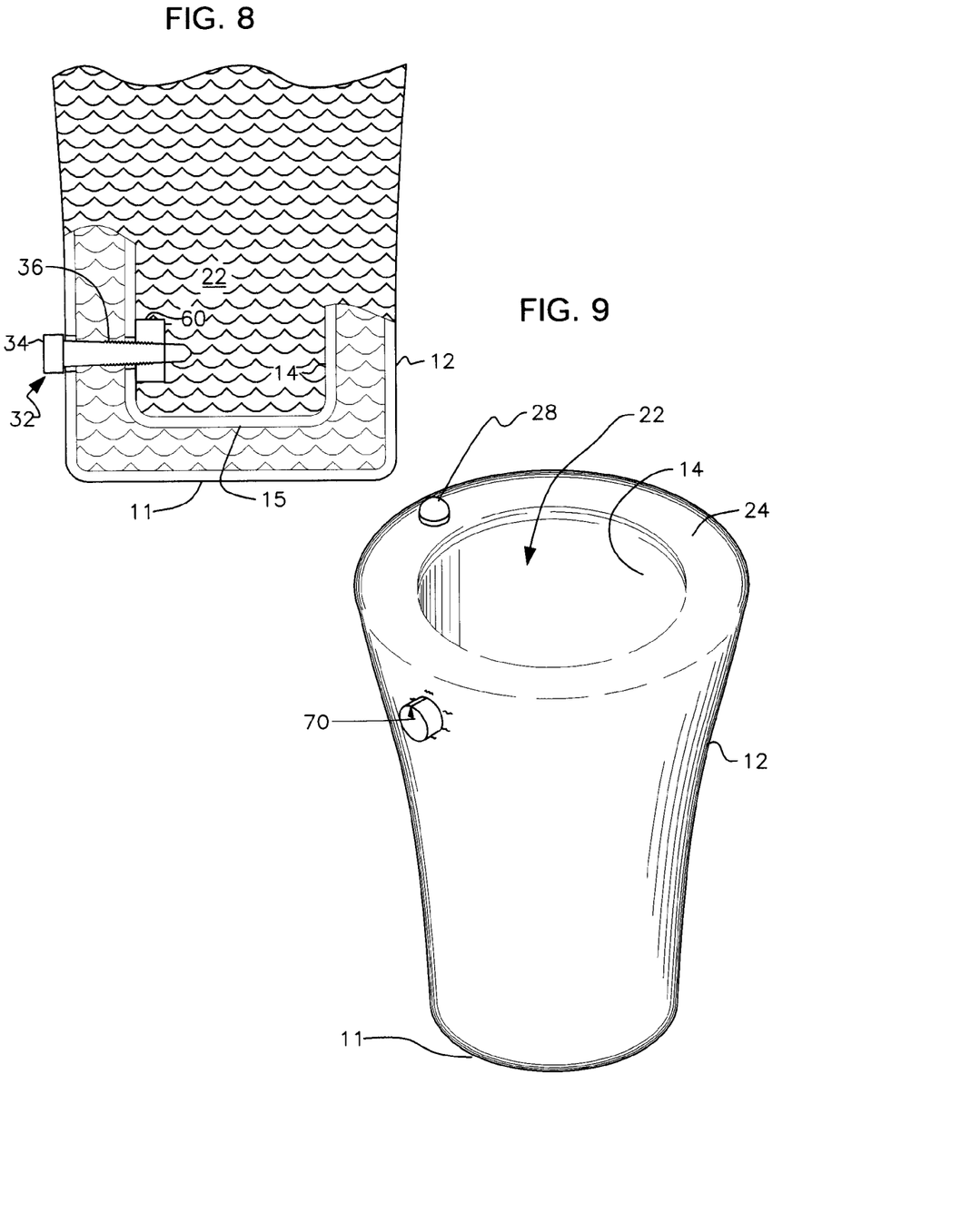
FIG. 8 is a sectional view of a fourth embodiment.
FIG. 9 is a perspective view of a fifth embodiment.

Check valve 60 is added to the distal free end of elongate tapered stem 36 in the fourth embodiment of the invention, depicted in FIG. 8. Check valve 60 does not interfere with the normal operation of flow control valve 32 so that water 25 in liquid fluid-holding reservoir 16 is free to flow into soil 22 or liquid fluid-holding space 22 when said control valve is opened in the manner described above. However, check valve 60 prevents reverse flow of water in said soil to liquid fluid-holding reservoir 16.

Figures 10, 11, 12:
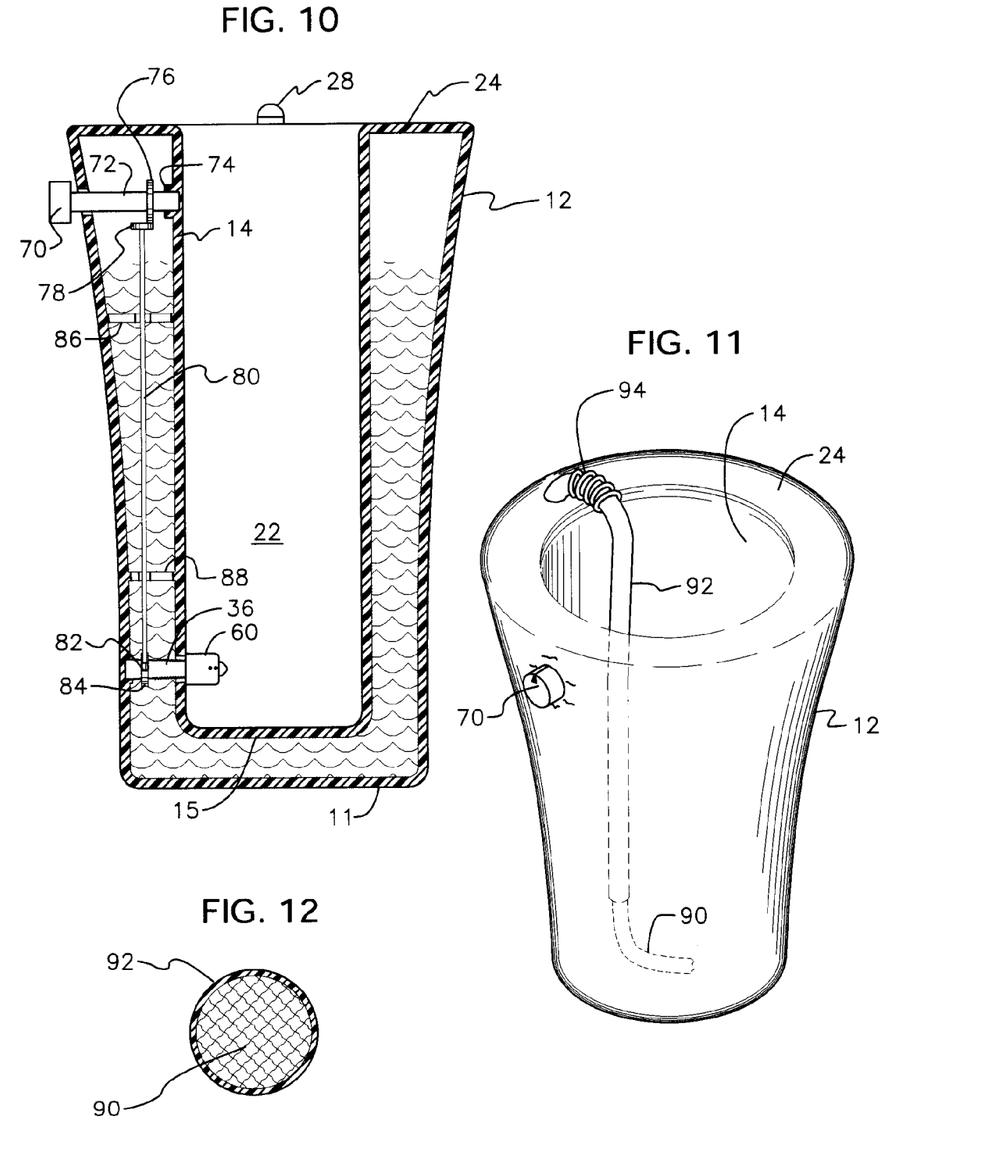
FIG. 10 is a sectional view of the fifth embodiment.
FIG. 11 is a perspective view of a sixth embodiment.
FIG. 12 is a cross-sectional view of a wick used in the sixth embodiment.

A fifth embodiment, having an elevated control knob 70, is depicted in FIGS. 9 and 10. Flow control valve 32 of the earlier-described embodiments is immersed within water and as such may be subject to some leakage. The embodiment of FIGS. 9 and 10 thus eliminates the opening formed in the lower end of exterior wall 12 for receiving said flow control valve 32, and further eliminates control knob 34 of said flow control valve 32. However, elongate tapered stem 36 remains and functions in the same way.

Shaft 72 is secured to elevated control knob 70 and a boss 74 formed in the radially outward side of interior wall 14 rotatably engages the free end of shaft 72. Shaft 72 carries gear 76 that meshes with horizontally disposed gear 78 that surmounts elongate shaft 80. A small worm-like gear 82 is formed in the lowermost end of shaft 80 and said gear 82 meshingly engages a larger gear 84 carried by elongate tapered stem 36 of the lower flow control valve. Gears 76, 78, 82, and 84 thus form a gear train that translates rotation of shaft 72 into simultaneous and corresponding rotation of elongate tapered stem 36 of flow control valve 32. Vertically spaced apart linkage braces 86, 88 provide lateral support to shaft 80 and are of open construction to allow water to flow therethrough.

FIGS. 11 and 12 depict a sixth embodiment that may be used in conjunction with flow control valves 32 or 70 or in lieu thereof. An elongate wick 90 has a first end immersed in water 25 in liquid fluid-holding reservoir 16 and a second end buried in soil 22. A flexible straw 92 covers all of wick except the first end thereof that is immersed in water and the second end thereof that is buried in soil 22. In this way, most of wick 90 is shielded and no wicking action can occur except at the exposed opposite ends; this distinguishes wick 90 from prior art wicks. Straw 92 has a flexible part 94 about mid-length thereof so that a return bend is easily formed therein as depicted.

Figure 13:
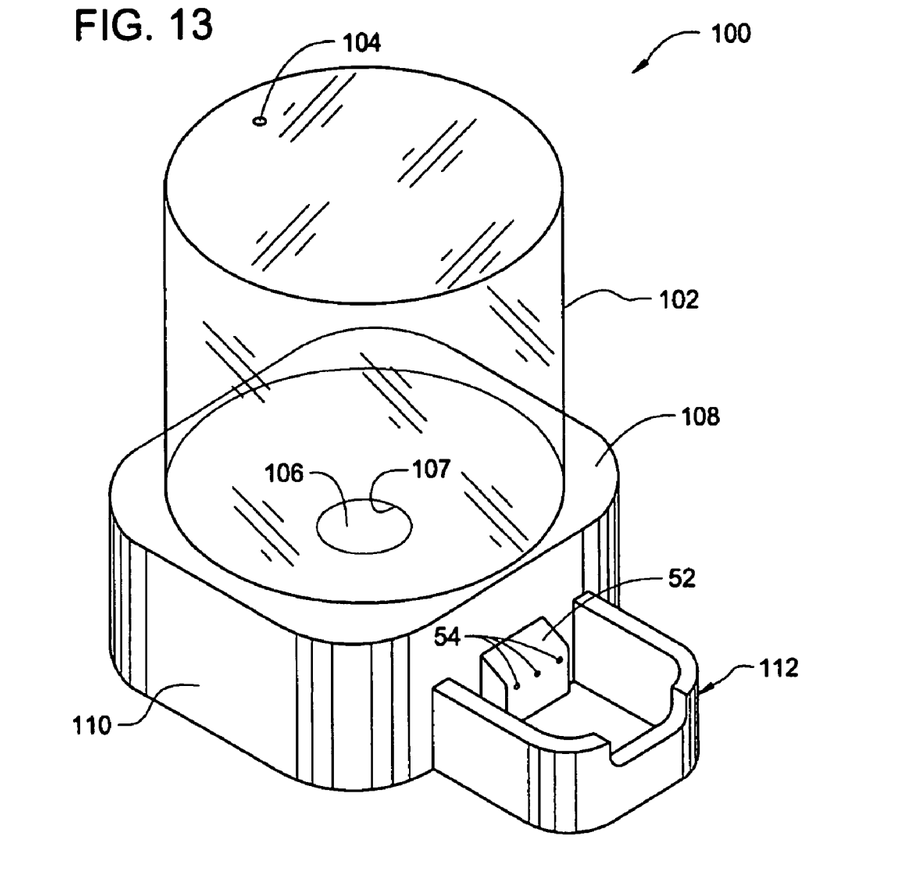
FIG. 13 is a perspective view of a seventh embodiment.
Figure 14:
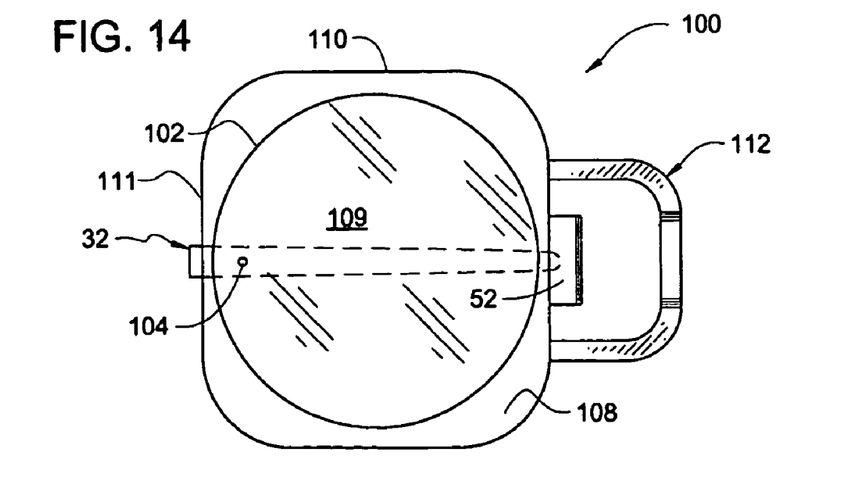
FIG. 14 is a top plan view of the seventh embodiment.

A seventh embodiment, depicted in FIGS. 13 and 14, provides a pet-watering dish 100 that incorporates novel flow control valve 32. A removable water container 102 having a vent opening 104 formed in its bottom wall and a projecting neck 106 integral with its top wall is inverted so that neck 106 is snugly received within central opening 107 formed in top wall 108 of bowl 110. Water-containing cavity 109 is formed by bowl 110 and top wall 108 thereof. Water in container 102 flows from neck 106 until the water level in cavity 109 rises to the level of the neck and prevents further outflow. Water in bowl 110 enters seeping chamber 52 and flows through openings 54 into a tray 112 from which a pet may access the water. This structure is easy to clean and it is easy to add water thereto.

As best understood in connection with FIG. 14, flow control valve 32 in this seventh embodiment is sufficiently long to extend from back wall 111 of base 110 into seeping chamber 52. Thus, the flow rate of water entering seeping chamber 52 is controlled by the rotational position of control knob 32 as in the earlier embodiments. In this way, the pet owner may tightly control the flow rate of water into tray 112.

Figure 15:
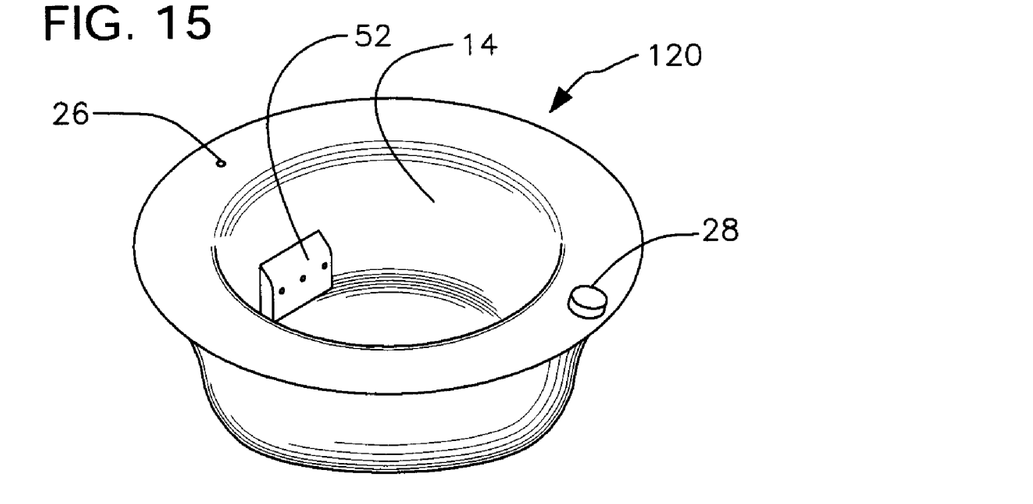
FIG. 15 is a perspective view of an eighth embodiment.
Figure 16:
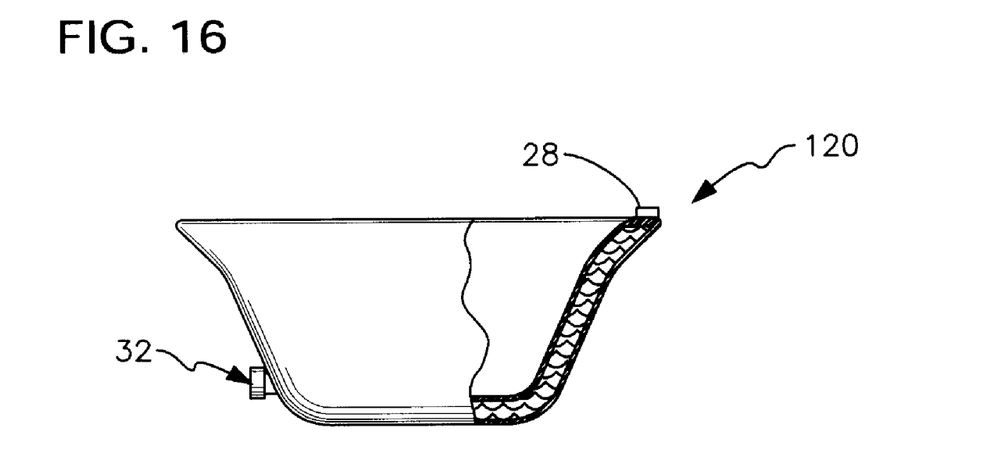
FIG. 16 is a side elevational view of the eighth embodiment.

An eighth embodiment, depicted in FIGS. 15 and 16, provides a pet-watering bowl 120 having hollow interior sidewall 14, flow control valve 32, and seeping chamber 52. This structure enables the pet owner to tightly control the flow of water into bowl 120 in the same way as accomplished in connection with shallow vase 50 of FIGS. 6 and 7.

Figure 17:
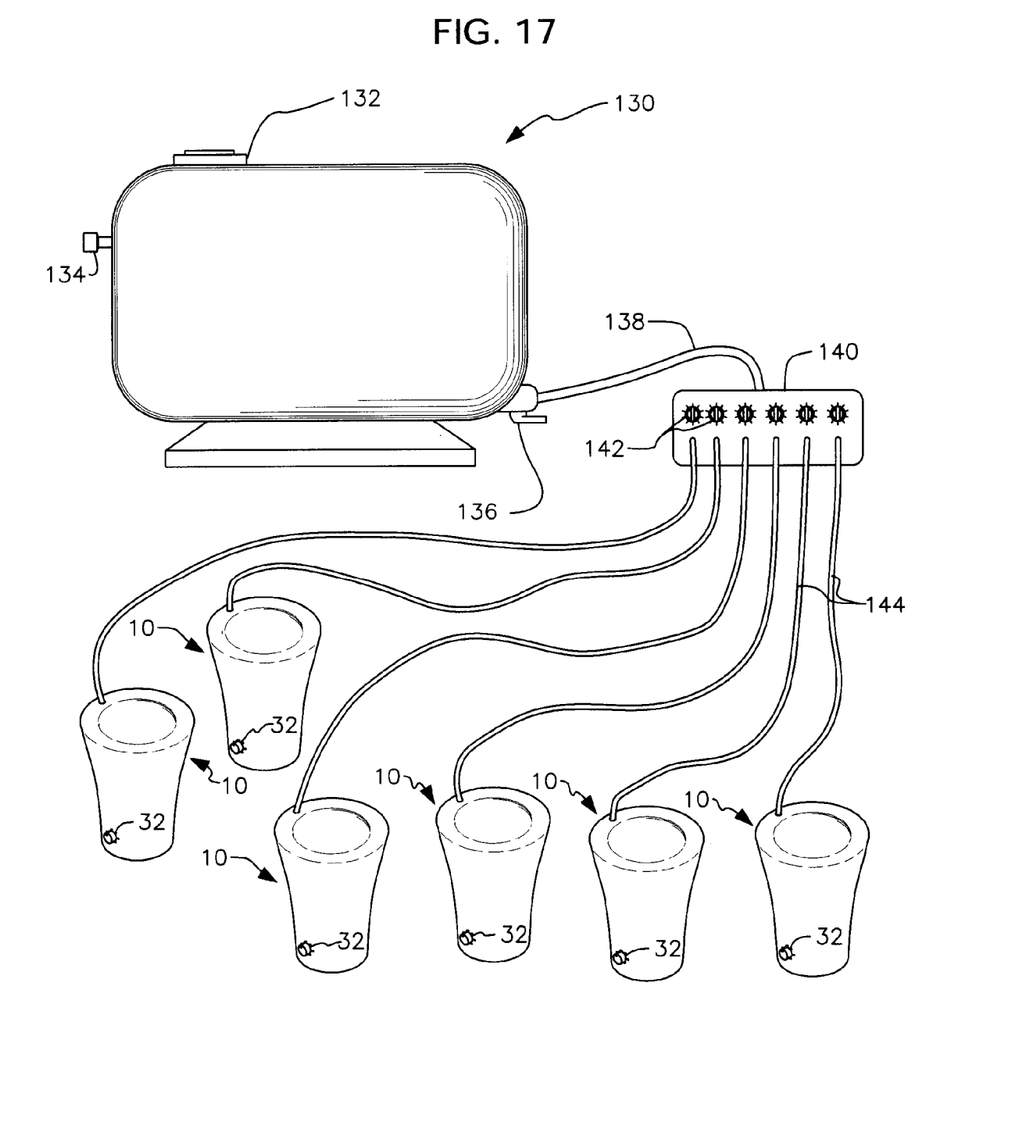
FIG. 17 is a side elevational view of a ninth embodiment.

FIG. 17 depicts a ninth embodiment having a holding tank 130 for holding a relatively large volume of water or a solution of water and liquid nutrients or fertilizer. Holding tank 130 includes fill cap 132 but it also includes a hose bib 134 so that a hose can be permanently secured thereto. By connecting a hose to a remote source of water under pressure and leaving a valve between the source of water and the hose open at all times, a continual supply of water to holding tank 130 is assured. On/Off valve 136 is positioned at the outlet of the holding tank. Hose 138 extends from On/Off valve 136 to manifold 140. A plurality of timers, collectively denoted 142, are mounted on manifold 140 and are independently adjustable so that water may be delivered to different plants according to differing schedules. Hoses 144 extend from a valve at each timer 142 to their respective plants. A first timer may open its associated valve for one hour once per week, a second may open its associated valve for ten minutes every day, and so on, as programmed by a user. The rate of water supplied to each individual pot, however, remains under the control of the user because the user still sets each control knob 34 of each self-watering pot individually.

FIGS. 18–21 depict a tenth embodiment. This embodiment differs from all previous embodiments in that it does not include a double-walled container. Instead, it is provided in the form of a relatively thin flask 146 that is inserted into a conventional single-walled pot between the side walls of the pot and the dirt contained in said pot. Water, including liquid fertilizer, nutrients, or the like, is still metered into the soil by the novel flow adjustment means of this invention, but the water flows from the flask. In effect, the flask transforms a single-walled container into a double-walled container for the extent of the single walled container that abuts the flask. Thus, the novel apparatus of this tenth embodiment is retrofit into an existing single-walled pot for plants, thereby transforming said pot into a self-watering pot.

Figure 18:
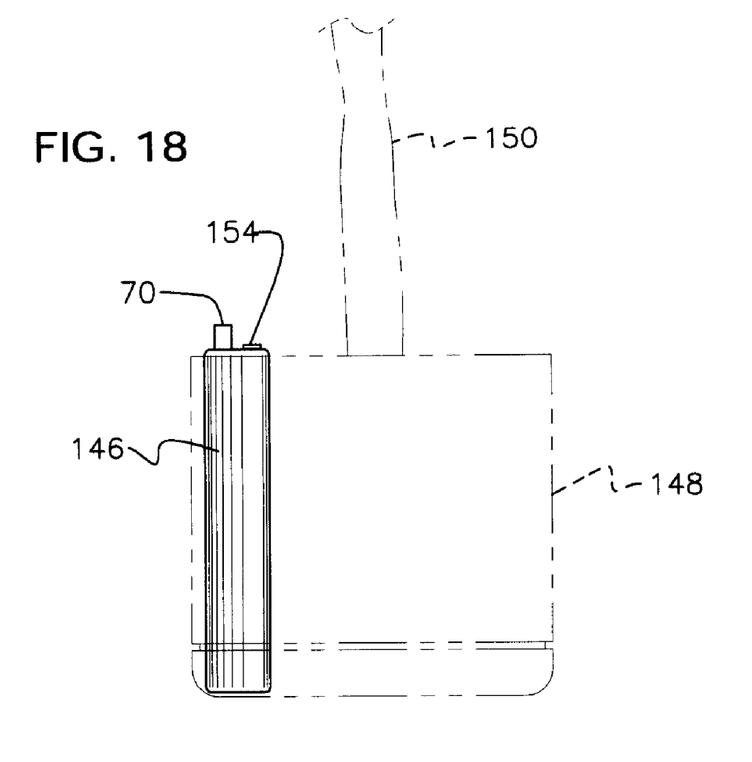
FIG. 18 depicts a tenth embodiment inserted into a conventional pot.
Figure 19:
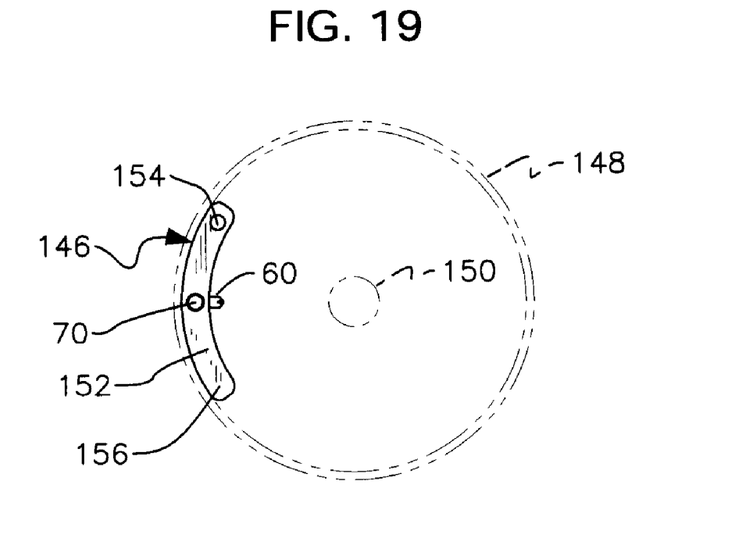
FIG. 19 is a top plan view of the tenth embodiment.

More particularly, as depicted in FIGS. 18 and 19, flask 146 is positioned on the periphery of a single-walled container 148 having a plant 150 therein. The soil in container 148 is not depicted to simplify the drawings. Although flask 146 could have a flat profile, it preferably has a radius of curvature that matches the radius of curvature of container 148. Flask 146 may have a relatively short circumferential extent as depicted in FIG. 19, or it could have a greater circumferential extent. It could even be provided in the form of an annular ring that completely circumscribes the container.

The narrow structure of flask 146 facilitates its insertion into a single-walled conventional pot.

Figures 20, 21:
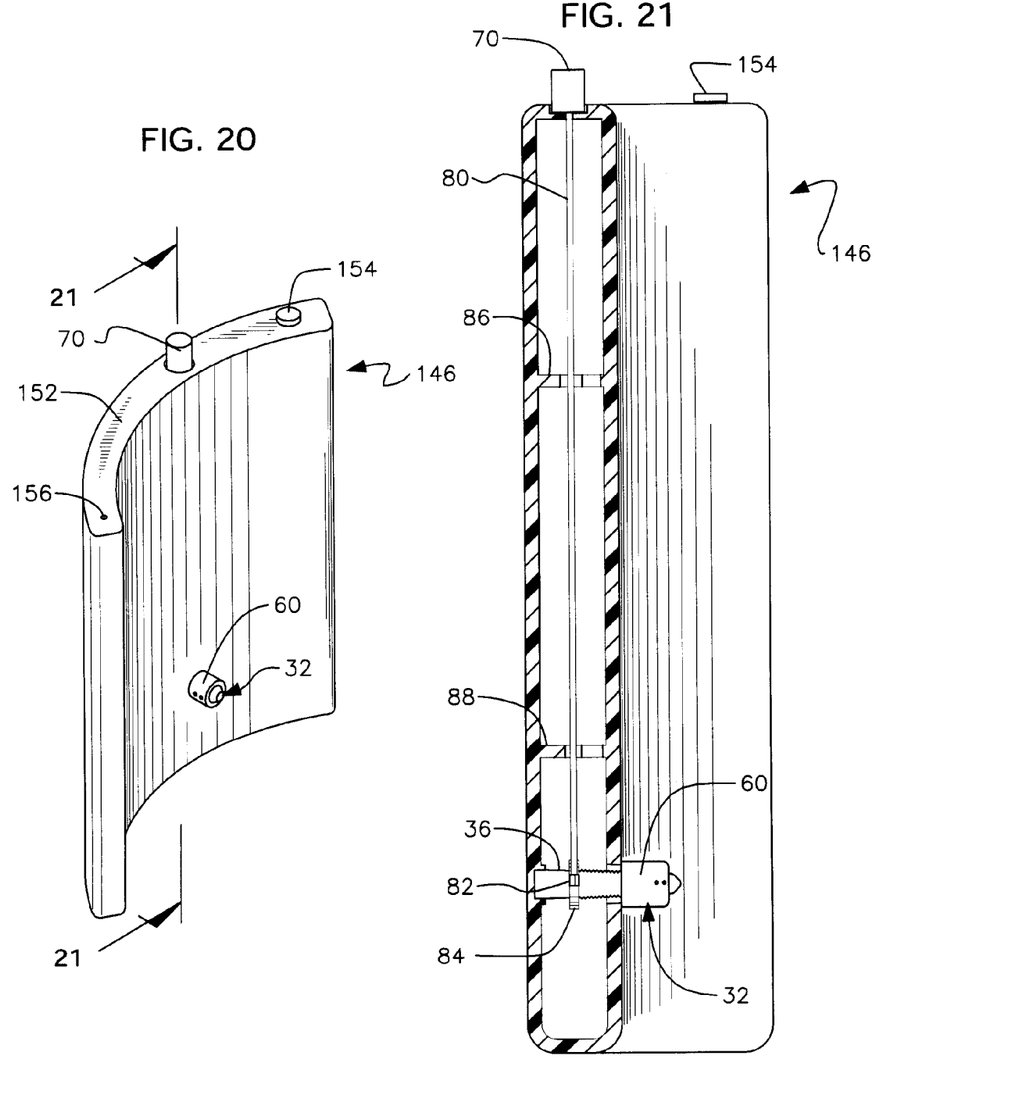
FIG. 20 is a perspective view of the tenth embodiment.
FIG. 21 is a sectional view taken along line 21—21 in FIG. 20.

As best depicted in FIGS. 20 and 21, flask 146 has a top wall 152 within which is formed a fill opening that is capped as at 154. A vent opening is denoted 156. The reference numeral 70 denotes a control knob like control knob 70 in the embodiment of FIGS. 10 and 11. As best understood by comparing said FIGS. 10 and 11 with the embodiment of FIGS. 18–21, manual rotation of control knob 70 in a clockwise direction rotates elongate control shaft 80 in the same direction. A small worm 82 is formed in the lowermost end of control shaft 80 and said worm 82 meshingly engages worm gear 84 carried by elongate tapered stem 36 of flow control valve 32. Gears 82 and 84 thus form a gear train that translates rotation of control shaft 80 into simultaneous and corresponding rotation of elongate tapered stem 36 of flow control valve 32 so that the manipulator of control knob 70 may regulate the flow rate of water from flask 146 into the soil within single-walled container 148.

Figure 22:
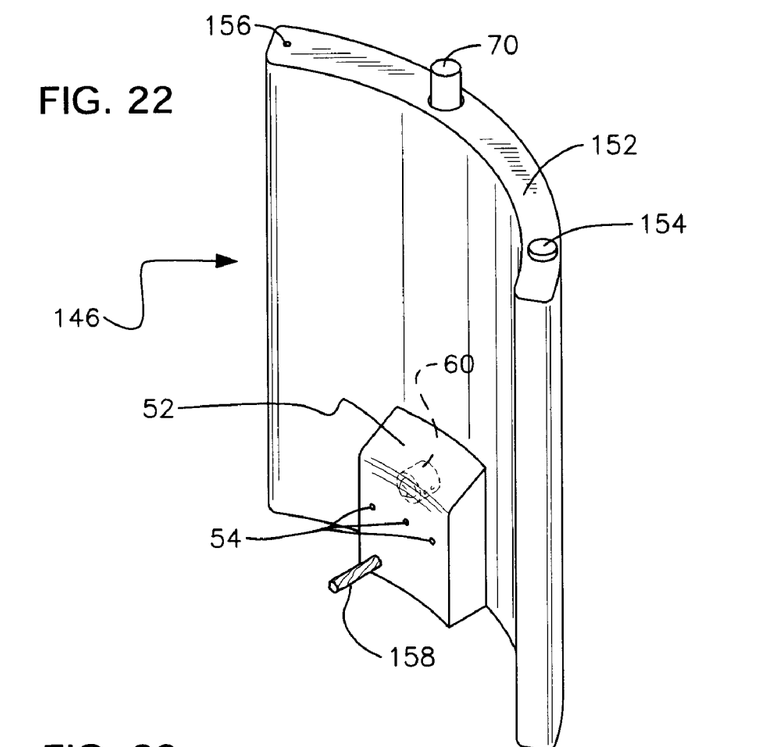
FIG. 22 is a perspective view of an eleventh embodiment.
Figure 23:
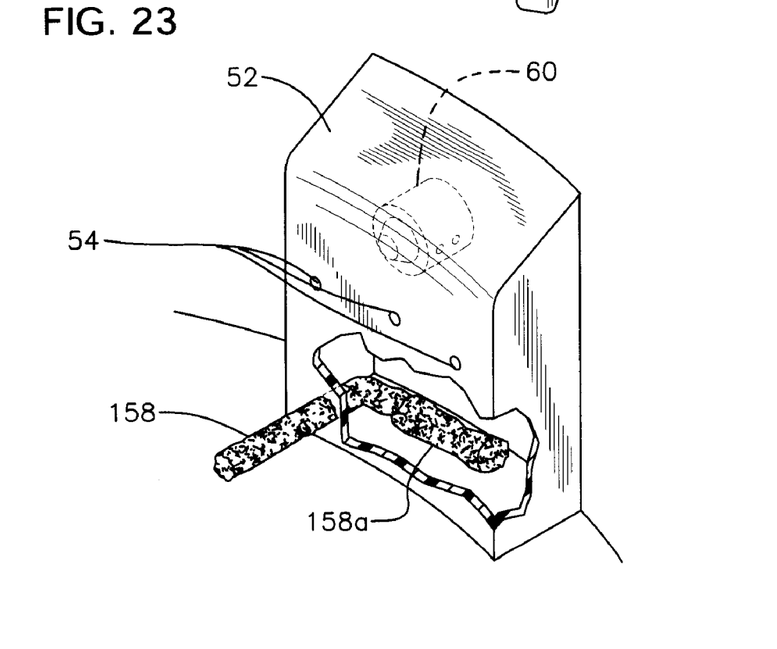
FIG. 23 is an enlarged, detailed, partially broken away perspective view of the reservoir means of the eleventh embodiment.

An eleventh embodiment is depicted in FIGS. 22 and 23. It includes the tenth embodiment and adds a seeping chamber defined by walls 52 having weep holes 54 and further having wick 158. Water is metered into the seeping chamber through check valve 60 that forms a part of flow control valve 32 and accumulates therein until it reaches the height of weep holes 54. Wick 158 extends into the soil, not shown, through an opening formed in walls 52 so that water is provided to the plant upon demand. An enlarged end of wick 158a is housed within the seeping chamber. The enlargement prevents the wick from being pulled out of the seeping chamber when flask 146 is inserted into container 148.

The use of flask 146 enables consumers to enjoy the benefits provided by double-walled containers even if a plant is in a single-walled pot.

Each of these embodiments promotes the conservation of water to an extent heretofore not achievable in the context of potted plants and pet watering trays. Widespread use of these embodiments will substantially limit the wasteful use of water now associated with potted plants and pets.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A device for delivering controlled amounts of water to a pet, comprising:

a bowl having a bottom wall, an upstanding side wall mounted about the bottom wall and projecting upwardly therefrom, a top wall, and a central aperture formed in said top wall;

said bottom wall, side wall, and top wall defining a water-holding space;

a container for holding water adapted to be disposed in inverted relation to said bowl, said container having a neck and a mouth, said neck adapted to extend through said central aperture when said container is supported in said inverted relation by said bowl;

said central aperture adapted to seal around said neck of said container so that water flows out of said container into said bowl until water in said bowl attains a depth that closes said mouth and prevents further water from flowing into said bowl;

a tray adapted to hold water secured to an exterior wall of said bowl;

a seeping chamber secured to an exterior wall of said bowl, said seeping chamber having a hollow interior and being contained within said tray and at least one opening formed in said seeping tray so that water seeping from said hollow interior of said seeping chamber through said at least one opening flows into said tray;

a first opening formed in said exterior wall of said bowl and a second opening formed in said exterior wall of said bowl in diametrically opposed relation to said first opening;

said second opening being in fluid communication with said hollow interior of said seeping chamber;

a flow control valve means having a control knob positioned on an exterior side of said side wall of said bowl;

said flow control valve means having an elongate tapered stem secured to said control knob for conjoint rotation therewith, said elongate tapered stem extending through said first opening and said second opening and into said hollow seeping chamber;

whereby full rotation of said control knob in a first direction seals said first and second openings and so that rotation of said control knob in a second direction opposite to said first direction maintains said first opening in a sealed condition but opens said second opening so that water in said reservoir flows into said hollow interior of said hollow seeping chamber;

whereby liquid fluid in said liquid fluid-holding reservoir is introduced into said hollow seeping chamber when said control knob is rotated in said second direction;

whereby the flow rate of liquid fluid into said hollow seeping chamber is controllable by said flow control valve; and whereby the rate of flow of liquid fluid from said at least one opening formed in said seeping chamber into said liquid fluid-holding space is controllable by adjustment of said flow control valve.

\* \* \* \* \*